US010263529B2

(12) United States Patent
Sandusky et al.

(10) Patent No.: US 10,263,529 B2
(45) Date of Patent: *Apr. 16, 2019

(54) ELECTRICAL CIRCUIT FOR DELIVERING POWER TO ELECTRONIC DEVICES

(71) Applicant: Smart Prong Technologies, Inc., Irvine, CA (US)

(72) Inventors: Randall L. Sandusky, Divide, CO (US); Neaz E. Farooqi, Colorado Springs, CO (US)

(73) Assignee: Smart Prong Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,754

(22) Filed: Aug. 14, 2018

(65) Prior Publication Data
US 2018/0351466 A1    Dec. 6, 2018

Related U.S. Application Data

(63) Continuation of application No. 15/590,991, filed on May 9, 2017, now Pat. No. 10,050,542.

(60) Provisional application No. 62/333,743, filed on May 9, 2016.

(51) Int. Cl.
*H02M 3/335* (2006.01)
*H02M 1/36* (2007.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 1/36* (2013.01); *H02M 3/33515* (2013.01); *H02M 3/33538* (2013.01); *H02M 3/33553* (2013.01); *H02M 2001/0009* (2013.01)

(58) Field of Classification Search
CPC ......... H02M 3/33538; H02M 3/33546; H02M 3/33553; H02M 3/33515
See application file for complete search history.

(56) References Cited

U.S. PATENT DOCUMENTS 9,780,677 B2    10/2017 Freeman et al.
2016/0365802 A1 *  12/2016 Freeman ................ H02M 1/08

* cited by examiner

*Primary Examiner* — Timothy J Dole
*Assistant Examiner* — Ishrat Jamali
(74) *Attorney, Agent, or Firm* — Maschoff Brennan

(57) ABSTRACT

One or more embodiments of the present disclosure may include a method of power regulation. The method may include determining a peak voltage level on a primary winding of a transformer. The method may also include selecting a particular coarse current level window based on the determined current level. Wherein the particular coarse current level window is one of a plurality of coarse current level windows. The method may additionally include determining a low window value based on the particular coarse current level window. The method may include generating a reference voltage based on the low window value. The method may also include generating a control signal based on the reference voltage. The method may additionally include transmitting the control signal to a switch circuit coupled to the primary winding of the transformer to adjust the current level on the primary winding of the transformer.

20 Claims, 15 Drawing Sheets

| Value Window No. | Current Range (iload) | Winlow |
|---|---|---|
| 1 | 4.500 | 3294 |
| 1 | 4.360 | 3294 |
| 2 | 4.359 | 2576 |
| 2 | 4.219 | 2576 |
| 3 | 4.218 | 2561 |
| 3 | 4.078 | 2561 |
| 4 | 4.077 | 2554 |
| 4 | 3.937 | 2554 |

| Value Window No. | Current Range (iload) | Gain Factor (gain_N) | Offset (offset_N) |
|---|---|---|---|
| 1 | 4.500 / 4.360 | -3 | 3815 |
| 2 | 4.359 / 4.219 | 1 | 2318 |
| 3 | 4.218 / 4.078 | 2 | 2242 |
| 4 | 4.077 / 3.937 | 1 | 2305 |
| 5 | 3.936 / 3.796 | 1 | 2365 |

Figure 9

ELECTRICAL CIRCUIT FOR DELIVERING POWER TO ELECTRONIC DEVICES

CROSS-REFERENCE TO RELATED APPLICATION

This application is a continuation of U.S. patent application Ser. No. 15/590,991 filed May 9, 2017, titled "ELECTRICAL CIRCUIT FOR DELIVERING POWER TO ELECTRONIC DEVICES", which is incorporated in the present disclosure by reference in its entirety, and which claims benefit of and priority to U.S. Provisional App. No. 62/333,743 filed May 9, 2016, which is incorporated in the present disclosure by reference in its entirety.

FIELD

The present disclosure relates generally to electrical power circuits and, more particularly, to an electrical power circuit for providing electrical power for use in charging and/or powering consumer electronic devices.

BACKGROUND

The use of electronic device is a useful tool for work, personal, and entertainment uses. Despite the proliferation of electronic devices, there still remains various limitations for delivering power to electronic device.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of power regulation. The method may include determining a peak voltage level on a primary winding of a transformer. The method may also include selecting a particular coarse current level window based on the determined current level. Wherein the particular coarse current level window is one of a plurality of coarse current level windows. The method may additionally include determining a low window value based on the particular coarse current level window. The method may include generating a reference voltage based on the low window value. The method may also include generating a control signal based on the reference voltage. The method may additionally include transmitting the control signal to a switch circuit coupled to the primary winding of the transformer to adjust the current level on the primary winding of the transformer.

One or more embodiments of the present disclosure may include a system for regulating power. The system may include a transformer. The system may also include a forward converter electrically coupled to the transformer, the forward converter configured to generate an output power signal based on a power signal on the transformer. The system may additionally include a primary side regulator configured to regulate the power signal on the transformer. The primary side regulator may include a primary side switch circuit. The primary side regulator may include a regulating controller configured to determine a peak current level on a primary winding of a transformer. The regulating controller may also be configured to select a particular coarse current level window based on the determined peak current level, wherein the particular coarse current level window is one of a plurality of coarse current level windows. The regulating controller may additionally be configured to determine a low window value based on the particular coarse current level window. The regulating controller may be configured to generate a reference voltage based on the low window value. The regulating controller may also be configured to generate a control signal based on the reference voltage. The regulating controller may additionally be configured to transmit the control signal to the primary side switch circuit coupled to the primary winding of the transformer to adjust the current level on the primary winding of the transformer.

One or more embodiments of the present disclosure may include a system for regulating power. The system may include a transformer. The system may include a forward converter. The forward converter may be electrically coupled to the transformer and configured to generate an output power signal based on a power signal on the transformer. The system may also include a primary side regulator configured to regulate the power signal on the transformer. The primary side regulator may include a primary side switch circuit electrically coupled to a primary winding of the transformer. The primary side regulator may also include a resistive element electrically coupled to the primary side switch circuit and to ground. The primary side regulator may include a voltage sensor configured to determine a voltage level on the primary winding of the transformer by determining a resistive voltage level on the resistive element. The primary side regulator may also include a capacitive element electrically coupled to the primary winding of the transformer, the capacitive element configured to reset the transformer. The primary side regulator may additionally include a regulating circuit. The regulating circuit may include a window selector circuit configured to select a particular coarse current level window and a particular fine value window within the particular coarse current level window based on the resistive voltage level. The regulating circuit may also include a window value circuit configured to determine a low window value based on the particular coarse current level window. The regulating circuit may additionally include a reference voltage generator configured to generate a reference voltage based on the low window value. The regulating circuit may include a control signal generator configured to generate a control signal based on the reference voltage. The regulating circuit may also include a transmitter configured to transmit the control signal to the primary side switch circuit to adjust the current level on the primary winding of the transformer.

BRIEF DESCRIPTION OF THE DRAWINGS

Example embodiments will be described and explained with additional specificity and detail through the use of the accompanying drawings in which:

FIG. 8 illustrates data records that may be used by a regulating controller;

FIG. 9 is an illustrations of example data records that may be used by a regulating controller for use in operating an electrical power circuit with a primary side regulation circuit;

Corresponding reference characters indicate corresponding parts throughout the drawings.

DETAILED DESCRIPTION

Some embodiments of the present disclosure relate to improvements to delivering power to electronic devices. In an electrical circuit that includes a primary side regulation (PSR) circuit and a forward converter, regulation of a power signal received by the forward converter may be performed by the primary side regulation circuit based a primary side regulation loop.

With reference to the drawings and in operation, a power circuit may provide Direct Current (DC) voltage output power to electronic devices from an Alternating Current (AC) mains supply. Typical AC mains supplies include 120 Volt Alternating Current (VAC), and 240 VAC. The power circuit may provide electrical power to charge electronic storage devices and/or power electronic products including, but not limited to, a cell phone, a smartphone, a tablet computer, a laptop, and/or any suitable electronic device that may benefit from one or more embodiments of this disclosure due to extremely high efficiencies and very low stand-by power requirements.

Embodiments of the present disclosure are explained with reference to the accompanying drawings.

Figure 1:
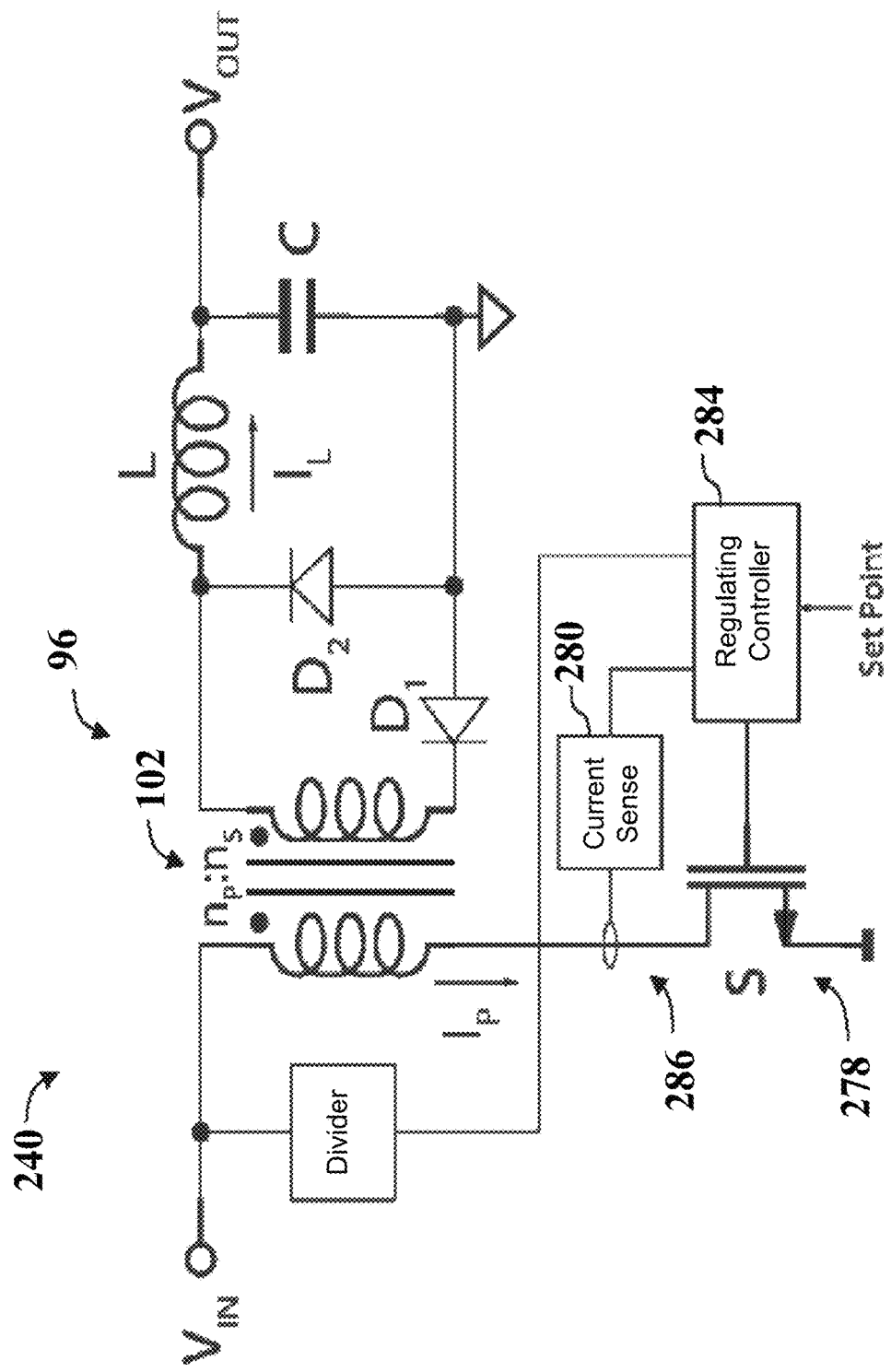
FIG. 1 is a schematic illustrations of an example primary side regulation circuit.
Figure 2:
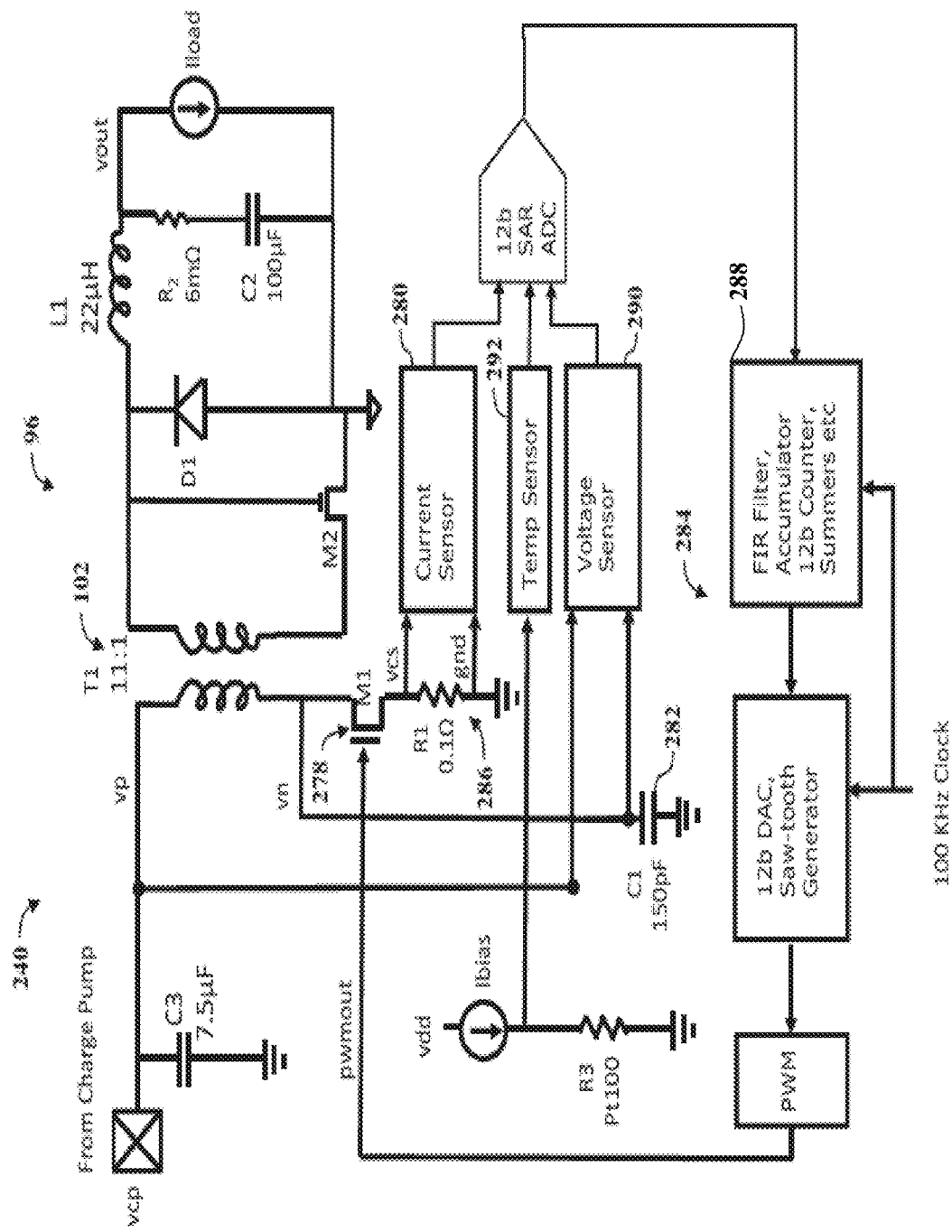
FIG. 2 is a schematic illustration of an example electrical power circuit including a primary side regulation circuit.
Figure 3:
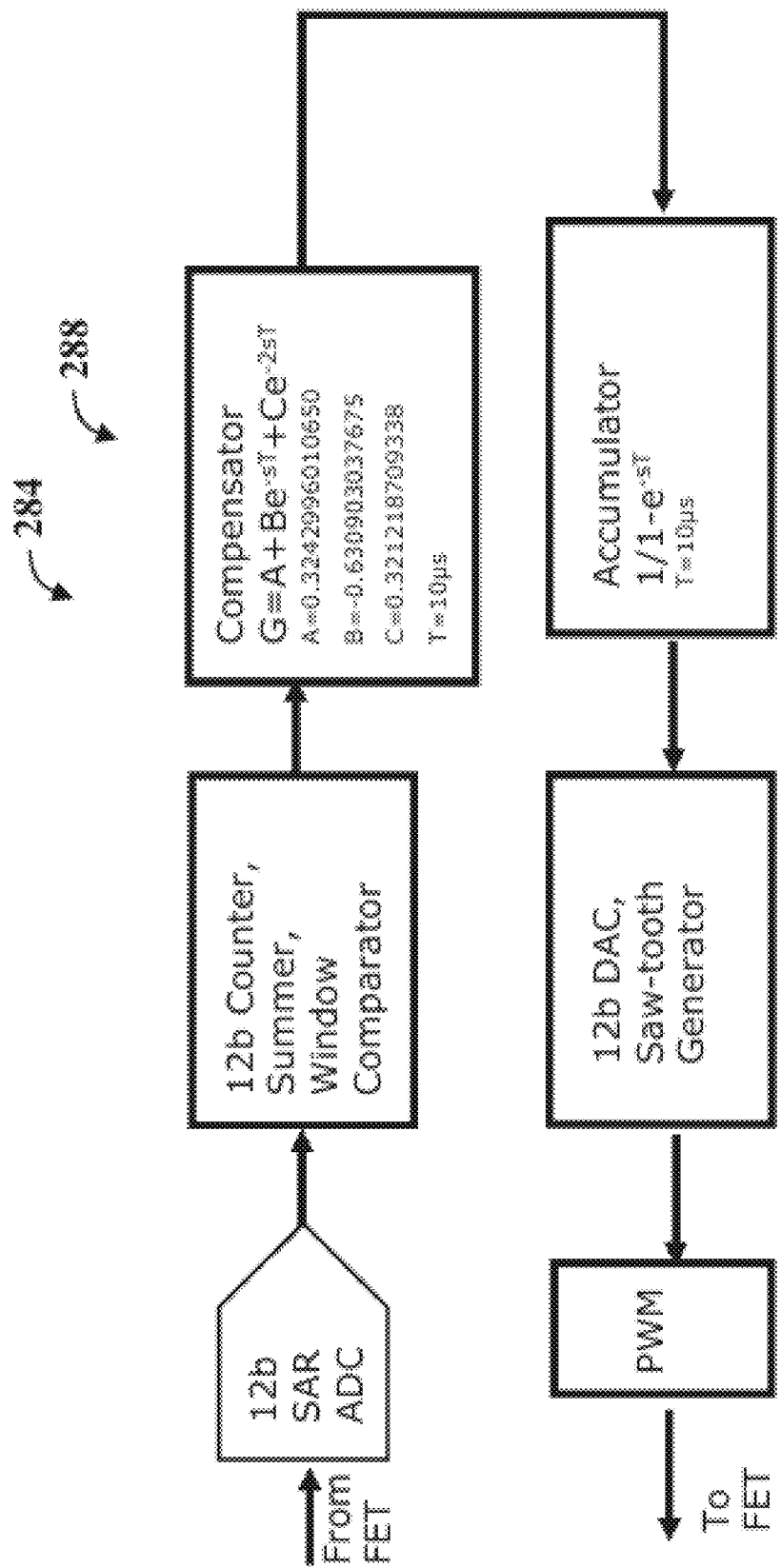
FIG. 3 is a block diagram illustrating a portion of an example regulating controller that may be implemented with a primary side regulation circuit.
Figure 4:
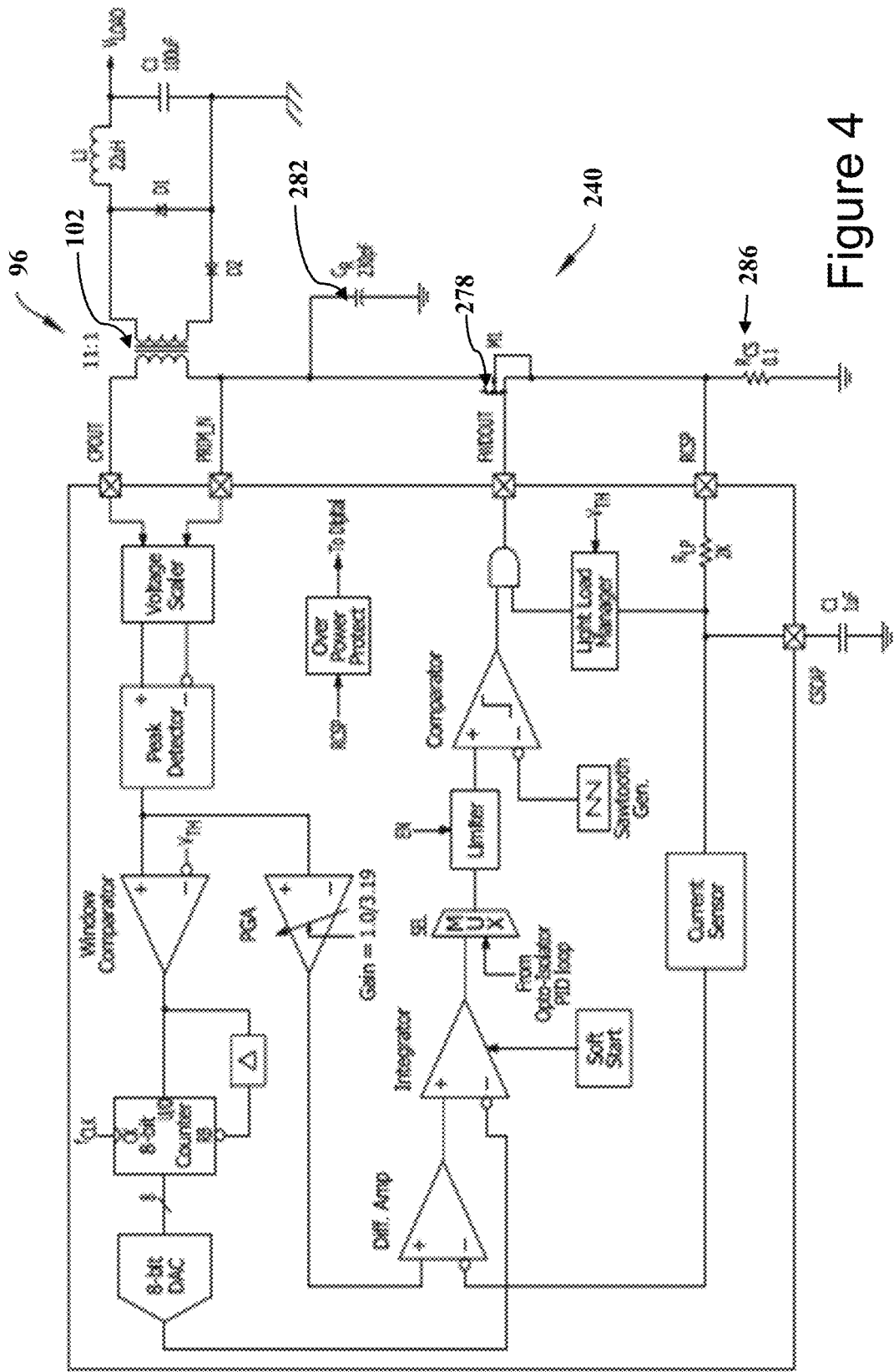
FIG. 4 is a schematic illustration of an example electrical power circuit that may include a primary side regulation circuit and the forward converter.

FIGS. 1 and 2 are schematic illustrations of an example primary side regulation circuit 240 that may be used to regulate power signals to a forward converter 96. FIG. 3 is a block diagram illustrating a portion of an example regulating controller 284 that may be implemented with the primary side regulation circuit 240. FIG. 4 is a schematic illustration of an example electrical power circuit 22 that may include the primary side regulation circuit 240 and the forward converter 96.

In some embodiments, the forward converter 96 may include a transformer 102 for receiving a power signal and generating an output power signal. The primary side regulation circuit 240 may include a primary side switching device 278, a current sensor 280, a capacitive element 282, a resistive element 286, and a regulating controller 284. In some embodiments, the primary side regulation circuit 240 may be electrically coupled to a primary side of the transformer 102.

In some embodiments, the primary side switching device 278 may be electrically coupled to the primary winding of the transformer 102. The current sensor 280, which may include a current sense circuit may determine (e.g. sense) a current level on the primary side of the transformer 102. The capacitive element 282 may be electrically coupled to the primary side of the transformer 102. The resistive element 286 may be electrically coupled to the primary side switching device 278 and to ground. In some embodiments, the primary side switching device 278 may include a MOSFET.

In some embodiments, the current sensor 280 may determine a voltage across the resistive element 286. Additionally or alternatively, the current sensor 280 may determine a current level on the primary side of the transformer 102 by measuring a resistive current level on the resistive element 286. The regulating controller 284 may generate a control signal which may be delivered to the primary side switching device 278. In some embodiments, the control signal may be a pulse-width modulated (PWM) signal. The control signal may be generated based on the determined current level on the primary winding of the transformer 102. The control signal may regulate the transformer 102 to deliver the power signal to the forward converter 96 at a particular voltage level.

In some embodiments, the regulating controller 284 may include a filtering control circuit 288, which may generate a filtered control signal for use in regulating the forward converter 96. The capacitive element 282 may reset the transformer 102 after each transformer cycle. In some embodiments, the capacitive element 282 may be coupled between the primary side switching device 278 and the primary winding of the transformer 102.

The primary side regulation circuit 240 may provide regulation for a wide current range. For example, in some embodiments, the current range may include 50 milliamps (mA) to 4.5 amps (A). In these and other embodiments, the current range may include values that are less than 50 mA and/or greater than 4.5 A. The primary side regulation circuit 240 may generate independent voltages and perform processes that are independent of output voltages. Likewise, the primary side regulation circuit 240 may be implemented for both forward and fly back converters, and digital primary side regulation PSR trimmed for temperature drift due to external components. Additionally or alternatively, the primary side regulation circuit 240 may operate without an auxiliary winding or special transformers.

In some embodiments, the primary side regulation circuit 240 may include a voltage sensor 290, which may include a voltage sense circuit. The voltage sensor 290 may be electrically coupled to the primary side of the transformer 102. The voltage sensor 290 may determine the voltage level on the primary winding of the transformer 102. The regulating controller 284 may be configured to generate the control signal based on the voltage level on the primary winding of the transformer 102. Additionally or alternatively, the primary side regulation circuit 240 may include a temperature sensor 292, which may include a temperature sense circuit. The temperature sensor 292 may determine a temperature of the power circuit 22 in which the primary side regulation circuit 240 and the forward converter 96 may be implemented. The regulating controller 284 may be configured to generate the control signal based on the temperature of the power circuit 22.

In some embodiments, the regulating controller 284 may determine a current level on the primary side of the transformer 102. In these and other embodiments, the regulating controller 284 may determine the current level on the primary winding of the transformer 102 by measuring the resistive current on the resistive element 286. The regulating controller 284 may generate the control signal based on the current level on the primary winding of the transformer 102. The regulating controller 284 may transmit the control signal to the primary side switching device 278 to operate the primary side switching device 278. In some embodiments, operating the primary side switching device 278 may regulate the transformer 102 to deliver the power signal at a particular voltage level.

Figure 5:
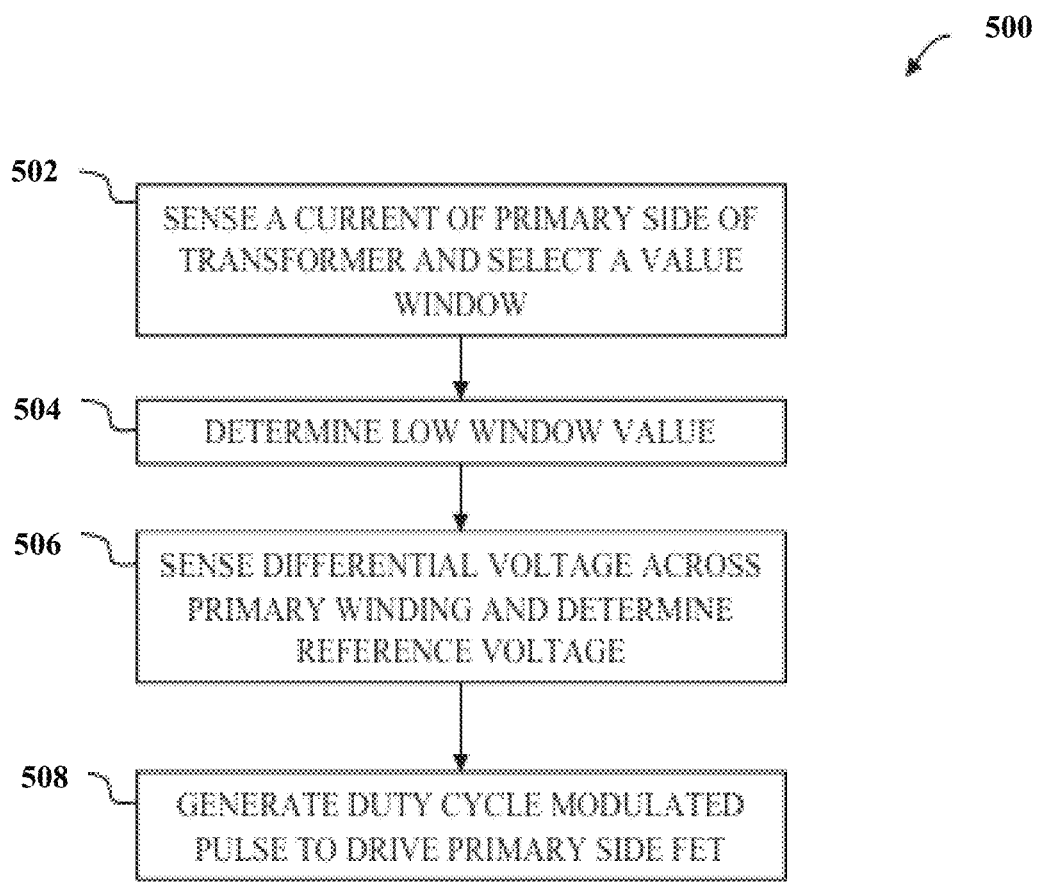
FIG. 5 illustrates a flowchart of an example method of regulating a current level on a winding of a transformer.

FIG. 5 illustrates a flowchart of an example method 500 of regulating a current level on a winding of a transformer, in accordance with one or more embodiments of the present disclosure. Although illustrated as discrete blocks, various blocks may be divided into additional blocks, combined into fewer blocks, or eliminated, depending on the particular implementation. The method 500 may be performed by a regulating controller, such as the regulating controller 284 of FIGS. 1-4.

In block 502 a current level on a primary winding of a transformer may be determined and a coarse current level value window may be selected. In some embodiments, a predefined range of coarse current levels may associated with one or more coarse current level windows. Each of the coarse current level windows may include a subset of fine current level windows that include current levels within a corresponding coarse current level window.

In some embodiments, a resistive current level on a resistive element electrically coupled to the primary winding of the transformer may be determined. The resistive current level may be determined as discussed above in relation to FIGS. 1-4. The coarse current value window may be selected from the plurality of value windows based on the current level on the primary winding of the transformer.

In some embodiments, in block 502, a peak current level during a pulse of a primary side switching device may be determined. The primary side switching device may be similar to the primary side switching device 278 of FIGS. 1-4. In these and other embodiments, the value window may be selected based on the peak current level. Additionally or alternatively, a temperature of a power circuit and/or a power device may be determined.

In block 504, a low window value associated with the selected coarse current value window may be selected. For example, in one embodiment, the regulating controller may accesses data records (e.g., a first window selection table 298 as illustrated in FIG. 8). The low window value may be selected based on the selected value window. In some embodiments, the regulating controller may select a gain-offset from a second window selection table 299 (e.g. data records as illustrated in FIG. 9). In these and other embodiments, the second window selection table 299 may include a plurality of gain factors and offset values associated with each low window value. In some embodiments, the gain factor and the offset value may be selected from the second window selection table 299 based on the selected value window. In these and other embodiments, the low window value may be determined based on the gain factor and the offset value. Additionally or alternatively, in block 504, the low window value may be determined based on the gain factor, the offset value, and the temperature of the power circuit.

In block 506, a voltage on the primary winding of the transformer may be determined. Additionally, in block 506, a reference voltage may be determined based on the voltage on the primary winding of the transformer. In some embodiments, the regulating controller may determine the voltage across the primary winding of the transformer as discussed above in relation to FIGS. 1-4. Likewise, the reference voltage value may be determined based on the low window value and the voltage level on the primary winding of the transformer as discussed above in relation to FIGS. 1-4.

In some embodiments, in block 506, a high window value associated with the selected coarse current value window may be determined based on the low window value. In these and other embodiments, the reference voltage may be determined based on the low window value and the high window value. Additionally or alternatively, the regulating controller may determine a peak voltage on the primary side of the transformer. The reference voltage may be determined based on the determined peak voltage, the low window value, and the high window value.

In block 508, a duty cycle modulated pulse (e.g. the control signal) may be generated. The control signal may be generated based on the reference voltage and may be used to drive the primary side switching device as discussed above in relation to FIGS. 1-4. Additionally or alternatively, the control signal may be generated based on the reference voltage and the selected value window. In some embodiments, the control signal may be a duty cycle modulated pulse delivered to the primary side switching device to adjust the voltage level of the output power signal.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
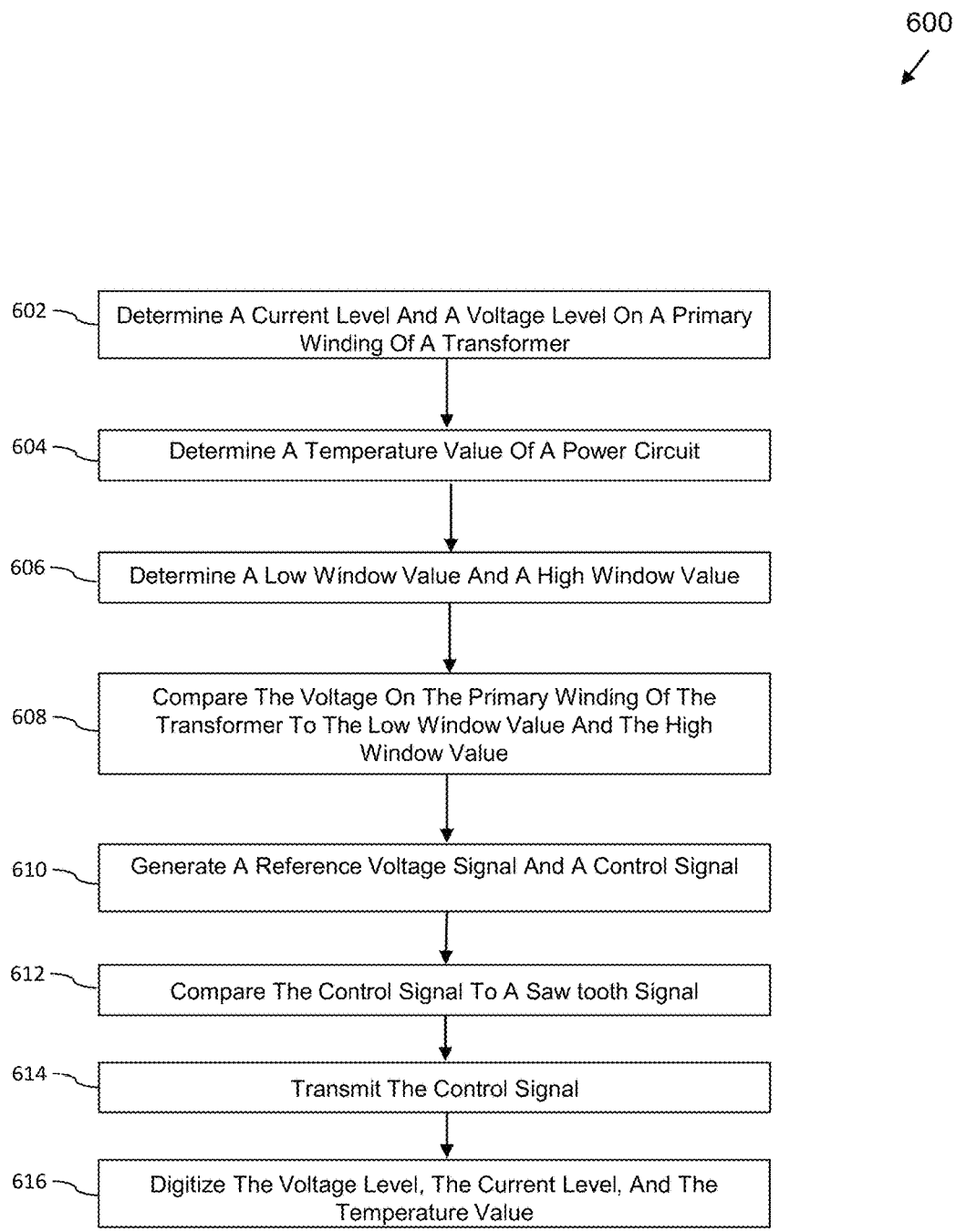
FIG. 6 illustrates a flowchart of an example method of regulating a current level on a winding of a transformer.

FIG. 6 illustrates a flowchart of an example method of regulating a current level on a winding of a transformer, according to at least one embodiment described herein. Although illustrated as discrete blocks, various blocks may be divided into additional blocks, combined into fewer blocks, or eliminated, depending on the particular implementation.

In some embodiments, the method 600 may be performed by a regulating controller such as the regulating controller 284 of FIGS. 1-4. The method 600 may generate a duty cycle modulated pulse which drives a primary side switch circuit to maintain regulation of a power signal on a transformer delivered to a forward converter.

At block 602, a current level and a voltage level on a primary winding of the transformer may be determined. In some embodiments, the current level and the voltage level may be determined by a current sensor such as current sensor 280 and/or voltage sensor 290 as discussed above in relation to FIGS. 1-4. In some embodiments, the current sensor may determine the voltage across a resistive element electrically coupled to the primary winding of the transformer.

At block 604, a temperature value of a power circuit may be determined. In some embodiments, the temperature value may be determined by a temperature sensor such as temperature sensor 292 of FIGS. 1-4.

At block 606, a low window value and a high window value may be determined. In some embodiments, a coarse current level window and a fine current level window may be selected based on the current and/or voltage on the primary winding of the transformer. In some embodiments, A current range on the primary winding of the transformer may be 50 mA to 4.5 A. In these and other embodiments, the current range may be separated dividing the 50 mA to 4.5 A output current range into the coarse current level windows which may include multiple fine current level windows. In some embodiments, the coarse current level windows and the fine current level windows maybe replicated for each current output range higher than 4.5 A, for instance 4.5 A to 100 A. Additionally or alternatively, the current range could be less than 50 mA and/or greater than 100 A. In some embodiments, a single coarse current level window may include plus or minus 50% of 1.5 A. Additionally or alternatively, as the current level decreases the range associated with the coarse current levels may decrease.

In some embodiments, the number of coarse current level windows and/or fine current level windows may be determined by an amount of accuracy for regulating the power single on the transformer. For example, if higher accuracy is determined, the number of coarse windows may be 64 or higher. If a lower accuracy is determined, the number of coarse windows may be 64 or lower. Additionally or alternatively, the number of fine current level windows per coarse current level window may increase if higher accuracy is determined and/or decrease if lower accuracy is determined.

Each coarse current level window and fine current level window may include a gain factor and/or an offset value. In some embodiments, once a particular coarse current level window is determined any additional calculations may be performed within values associated with the particular coarse current level window. For example, if ten coarse current level windows with twenty fine current level windows per coarse current level window are selectable, once the particular coarse current level window is selected the regulating controller may select a fine window within the corresponding coarse current level window, without viewing any other coarse current level windows. In some embodiments, the regulating controller may review the other coarse current level windows if the voltage and/or current on the primary winding of the transformer either exceeds or drops below the current and/or voltage range associated with the particular coarse current level window.

In some embodiments, in block 606, a gain factor and offset value associated with the selected coarse current level window and/or fine current level window may be selected. Each coarse current level window and fine current level window may include unique gain factor and offset value which may be preconfigured and/or determined by the regulating controller.

The low window value may be determined based on the temperature value, the gain factor, and/or the offset value as shown in equation 1:

$$\text{winlow} = \text{gain}\_N * \text{tempout} + \text{offset}\_N, \qquad \text{Equation 1}$$

The high window value may be determined based on the low window value and an integer, as shown in in equation 2:

$$\text{winhigh} = \text{winlow} + 128, \qquad \text{Equation 2}$$

Wherein, in equations 1 and 2, N may correspond to the value window number, winlow may be a 12 bit value for the low end of the selected window, gain_N may be the Gain factor (e.g., slope) associated with the selected coarse current level window and/or the fine current level window, offset_N may be the offset value associated with the selected coarse current level window and/or the fine current level window (in some embodiments offset_N may be a 12 bit word), tempout may be a digital copy of the temperature value, and winhigh may be a 12 bit value for the high end of the selected window.

At block 608, the voltage level and/or the current level on the primary winding of the transformer may be compared to the low window value and/or the high window value. A comparison based on the comparison may be used to drive an up down counter. In some embodiments, the up down counter may receive a 100 kilohertz (kHz) signal. For example, regulating controller may use a voltage sensor to determine the voltage on the primary winding.

At block 610, a reference voltage signal and a control signal may be generated. The reference voltage and the control signal may be determined using equations 3-6. For example, in some embodiments, the reference voltage may be generated according to equation 3.

$$\text{vref} = \text{compwin} + \text{winlow}, \qquad \text{Equation 3}$$

Likewise, a pulse width modulation signal may be determined according to equation 4.

$$\text{pwm} = \text{curoutd} - \text{compwin} + \text{winlow}, \qquad \text{Equation 4}$$

Wherein, in equations 3 and 4, Vref may be the reference voltage, compwin may be a 12 bit counter output, winlow may be the low window value determined above, pwm may be a digital word (12 bit) to represent a specific duty cycle of a primary side switching circuit, and curoutd may be a digitized copy of the current on the primary winding of the transformer.

A filtered version of the pulse width modulated signal may be determined using equation 5.

$$\text{pwm}\_f = \text{pwm}*A + Be^{-st} + Ce^{-2st}/1 - e^{-st}, \qquad \text{Equation 5}$$

Wherein, in Equation 5, pwm_f may be a Filtered version of pwm, pwm may be a digital word (12 bit) to represent the specific duty cycle, e may be the exponent function, A may be 0.3242996010650, B may be B=−0.630903037675, and C may be 0.321218709338.

The control signal may be determined using equation 6.

$$\text{dacout} = \text{pwm}*\text{lsb} + \text{reflow}, \qquad \text{Equation 6}$$

Wherein in Equation 6, dacout may be control signal, pwm may be a digital word (12 bit) to represent a specific duty cycle, lsb may be 12 bit DAC least significant bit voltage level, and reflow may be a low reference for the 12 bit DAC.

At block 612, the control signal may be compared to a saw tooth signal. In some embodiments, a duty cycle modulated pulse signal may generated based on the comparison. In these and other embodiments, the duty cycle modulated pulse signal may drive the primary side switch circuit to maintain regulation of the power signal being received by the forward converter. In some embodiments, a duty cycle modulated pulse based on the determined data for each pulse of the primary side switching device may be determined.

At block 614, the control signal may be transmitted to the primary side switch circuit. In some embodiments, the control signal may be the duty cycle modulated pulse and may drive the switch circuit to adjust the current level and/or voltage level on the primary winding of the transformer. In some embodiments, the control signal may be square wave duty cycle modulated signal.

At block 616, the voltage value, the current value, and/or the temperature value may be digitized. In some embodiments, the method 600 may continuously determine the voltage level, the current level, and/or the temperature level by implementing a 12 bit Analog to Digital Converter (ADC).

Method 600 may be performed using less blocks or additional blocks. For example the method 600 may include determining whether to start in soft start mode. In response to determining to start in soft start mode the power signal on the transformer may be set so that the forward converter outputs a default voltage. For example, the default voltage may be close to 5 V. The method 600 may perform block 602 in response to determining a startup time window has elapsed.

In some embodiments, the primary side regulation circuit may be configured with a "forward controller" configuration, which may increase efficiency. Additionally or alternatively, the primary side regulation circuit may be configured with "flyback" topologies, or topologies such as the SEPIC, Cúk, Push-Pull. In some embodiments, the power supply may not include opto-isolation parts due to implementation of the primary side regulation circuit as disclosed herein.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 7:
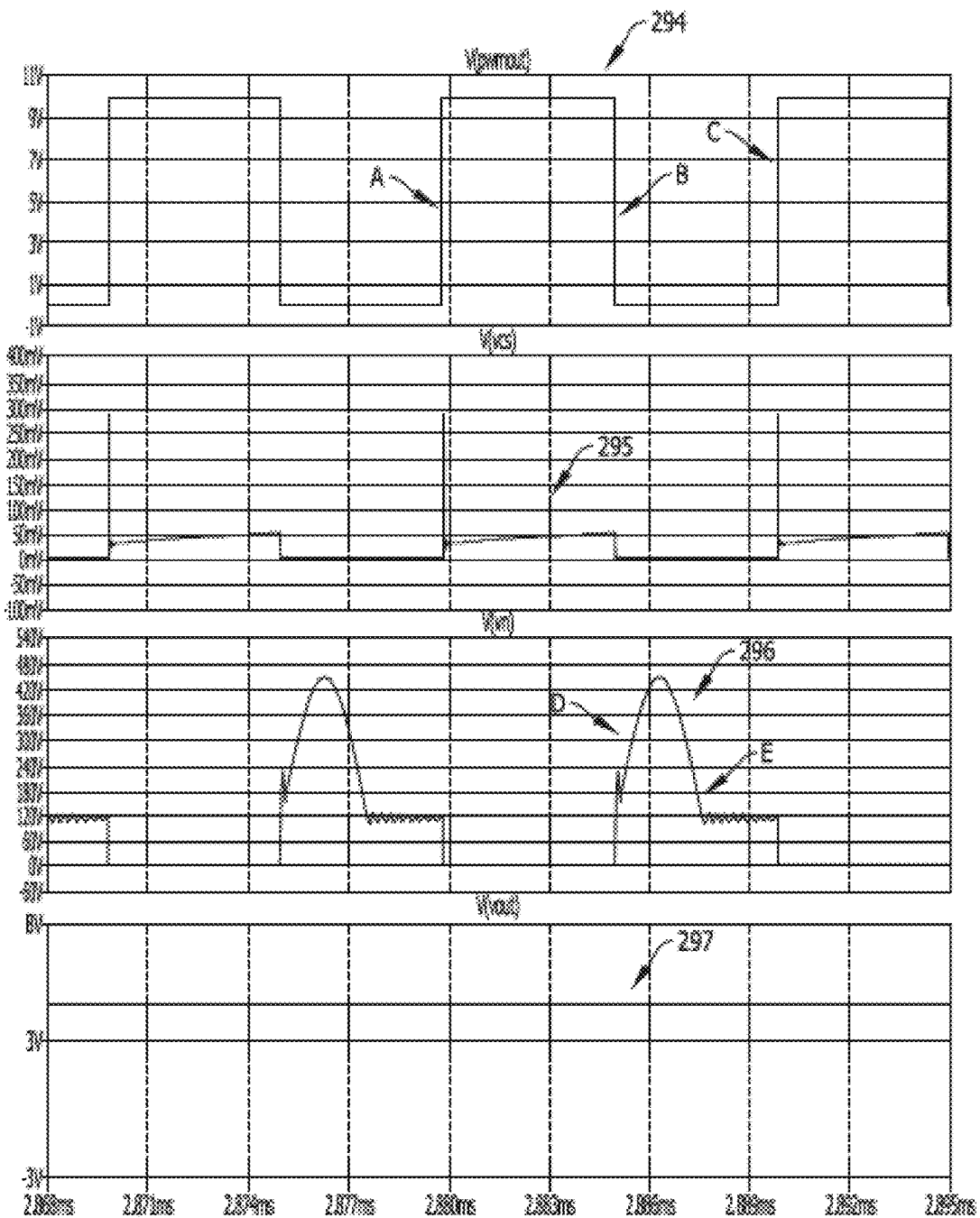
FIG. 7 illustrates a graphical representation of an example timing relationship associated with operational parameters of a primary side regulation circuit.

FIG. 7 illustrates a graphical representation of an example timing relationship associated with operational parameters of a primary side regulation circuit. FIG. 7 includes a first plot 294 of the control signal to the primary side switching device, a second plot 295 of a source of the primary side switching device, a third plot 296 of a drain of a primary side switching device showing reset, and a fourth plot 297 of a secondary side output of the forward converter 96 in accordance with one or more embodiments disclosed herein.

FIGS. 8 and 9 illustrate data records that may be used by a regulating controller.

Referring back to FIGS. 2-3 and 10-15, in some embodiments, the regulation controller 284 may include a micro-controller a part of which can also be implemented in a state machine analog. In some embodiments, an external non-volatile memory for trim, code, and constant storage may be implemented. The external or embedded micro-controller may control startup, operational modes, and overall primary side regulation forward converter control loop management. Additionally or alternatively, the primary side regulation circuit 240 may be implemented using digital and/or analog hardware.

Figure 10:
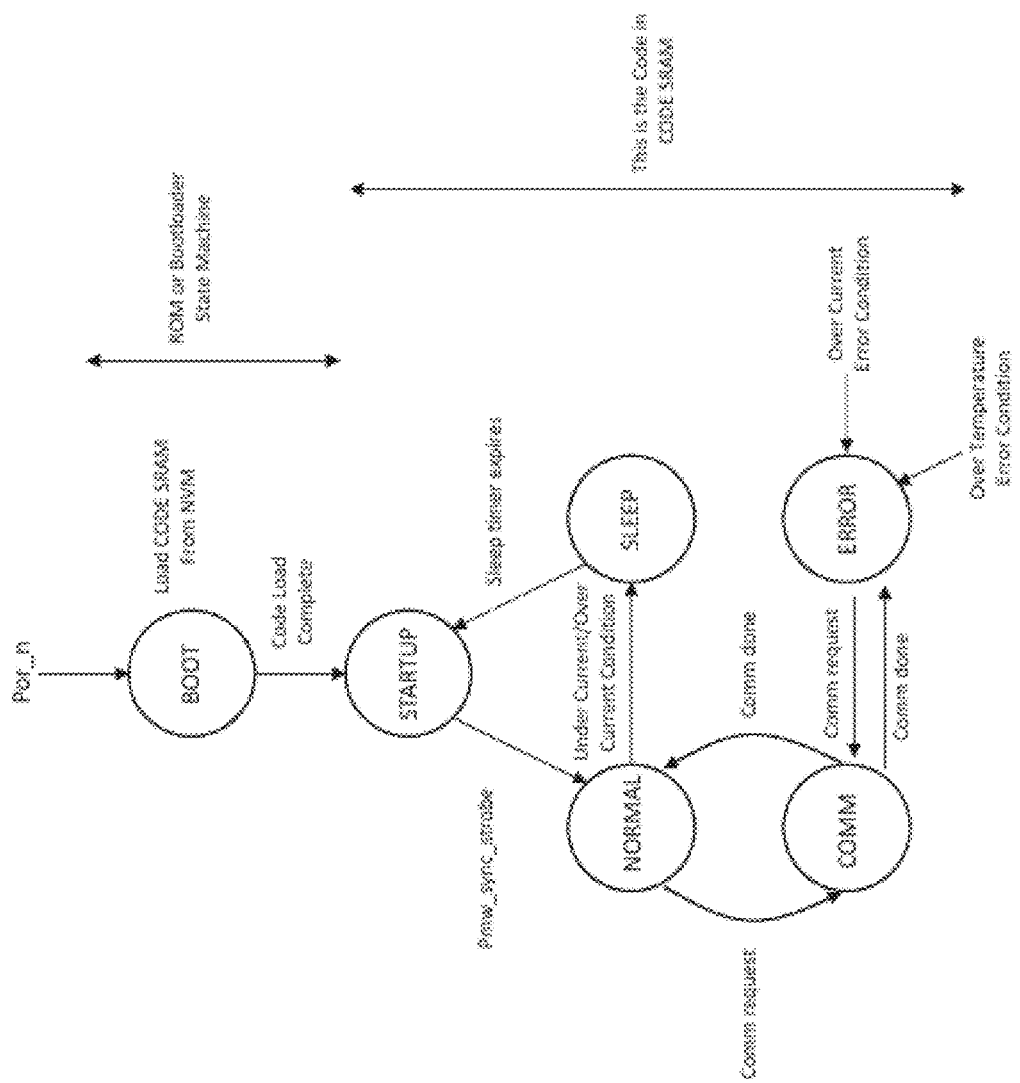
FIG. 10 illustrates an example primary side regulation level state diagram.
Figure 11:
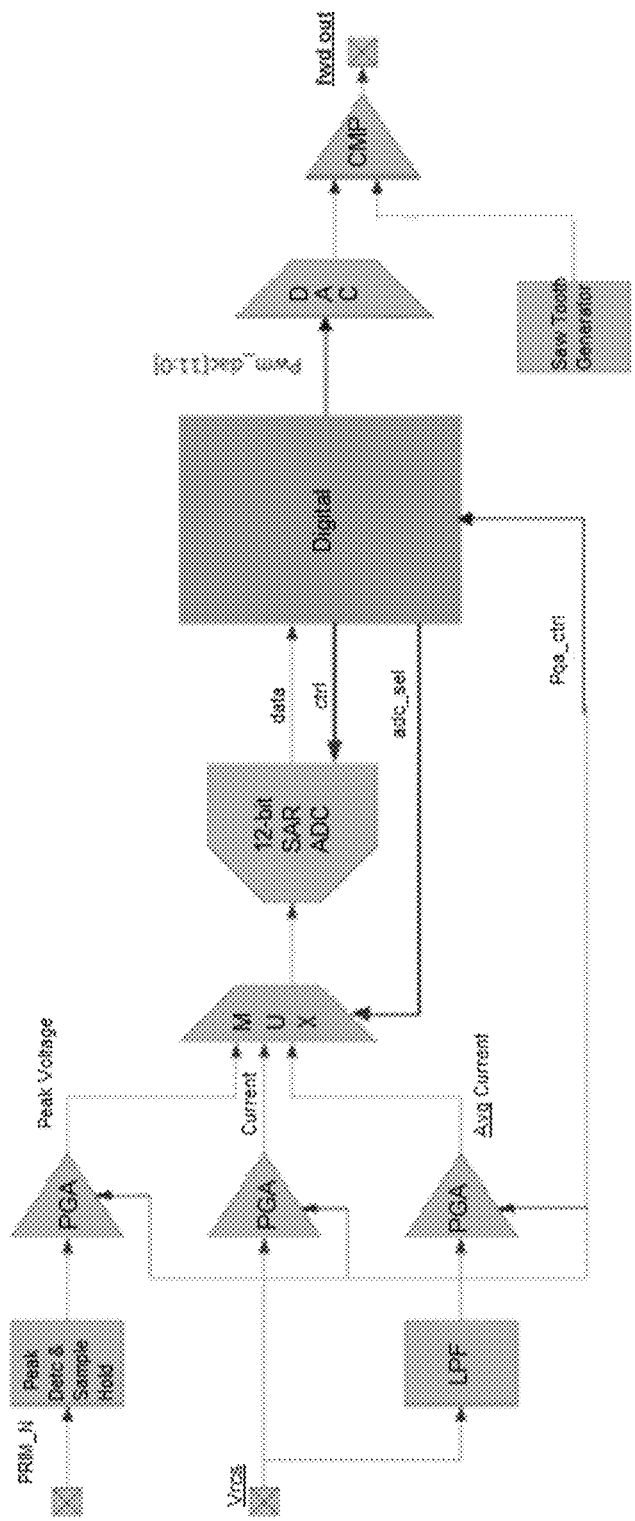
FIG. 11 illustrates an example primary side regulation control loop analog sub system partition.
Figure 12:
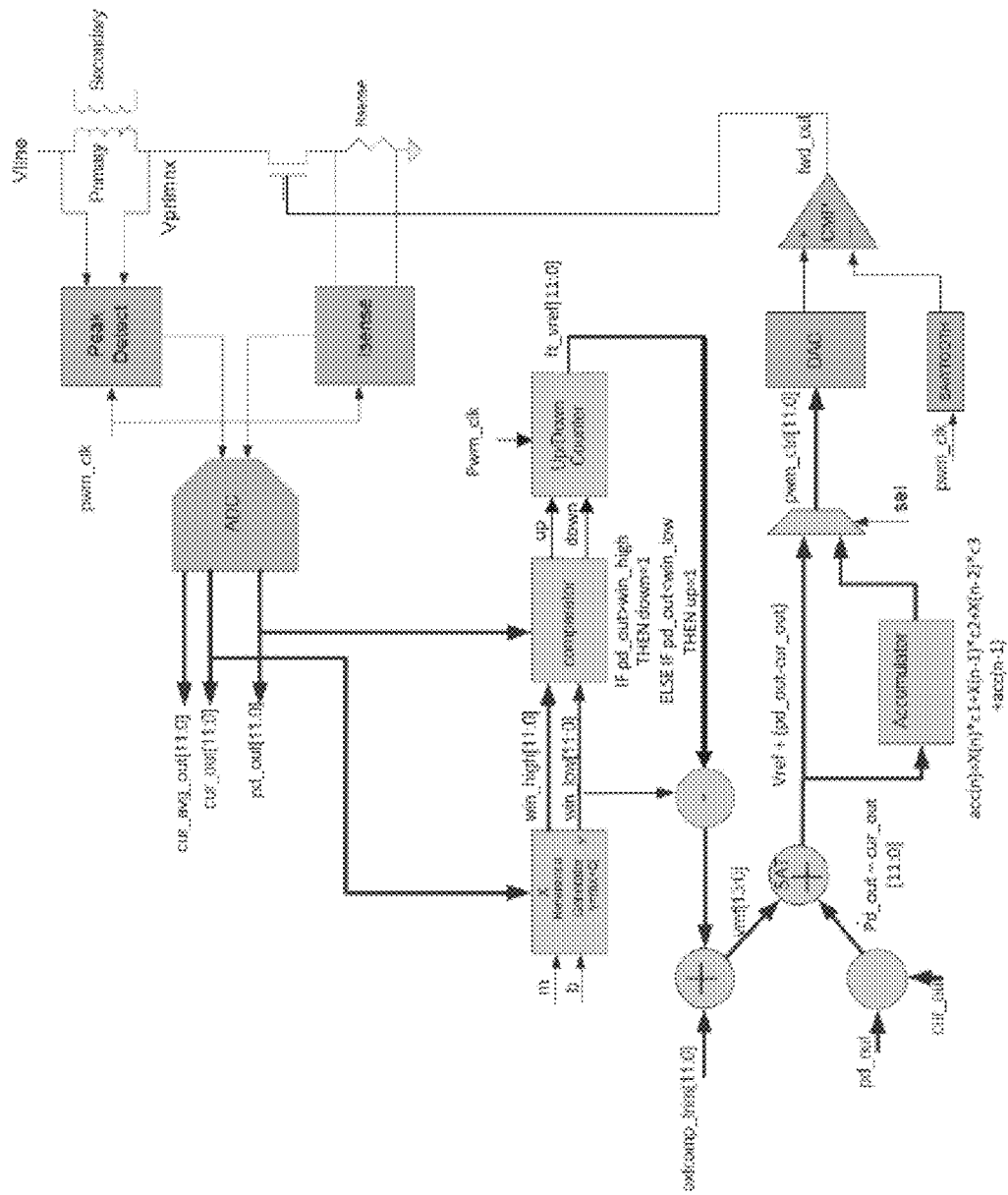
FIG. 12 is a block diagram of an example digital primary side regulation control loop.

FIG. 10 illustrates a primary side regulation level state diagram, in accordance with one or more embodiments disclosed herein. FIG. 11 illustrates a primary side regulation control loop analog sub system partition, in accordance with one or more embodiments disclosed herein. The primary side regulation control loop partition may include one or more sub elements that are implemented in an analog sub system. FIG. 12 illustrates a primary side regulation control loop digital sub-system partition. In some embodiments, the digital sub-system partition may include an ADC Controller, Sleep Counter, Clock Generator, Comparator Engine, and PSR engine. Additionally or alternatively, one or more functions of the primary side regulation control loop may be implemented in firmware running on the micro-controller. The Comparator Engine may implement fixed logic to support potential comparisons performed to find a PSR Regulation Window Threshold (PRWT).

The PSR engine may perform calculations for the control loop. A 12 bit wide DAC control word to the PWM DAC in the Analog Sub System may be implemented to maintain resolution for a Pulse Width Modulation control signal, fwd_out, which may be transmitted to an external FET controlling current through the primary transformer winding.

In some embodiments, the PSR firmware processing may occur while the PSR control loop is active. In these and other embodiments, while the PSR control loop is active, the PSR firmware may utilize the PSR Engine to update the PWM DAC pulse width control. In these and other embodiments, the PSR firmware may enable the PSR Engine to run either independently of the micro-controller, or under the micro-controller's direct supervision.

Figure 13:
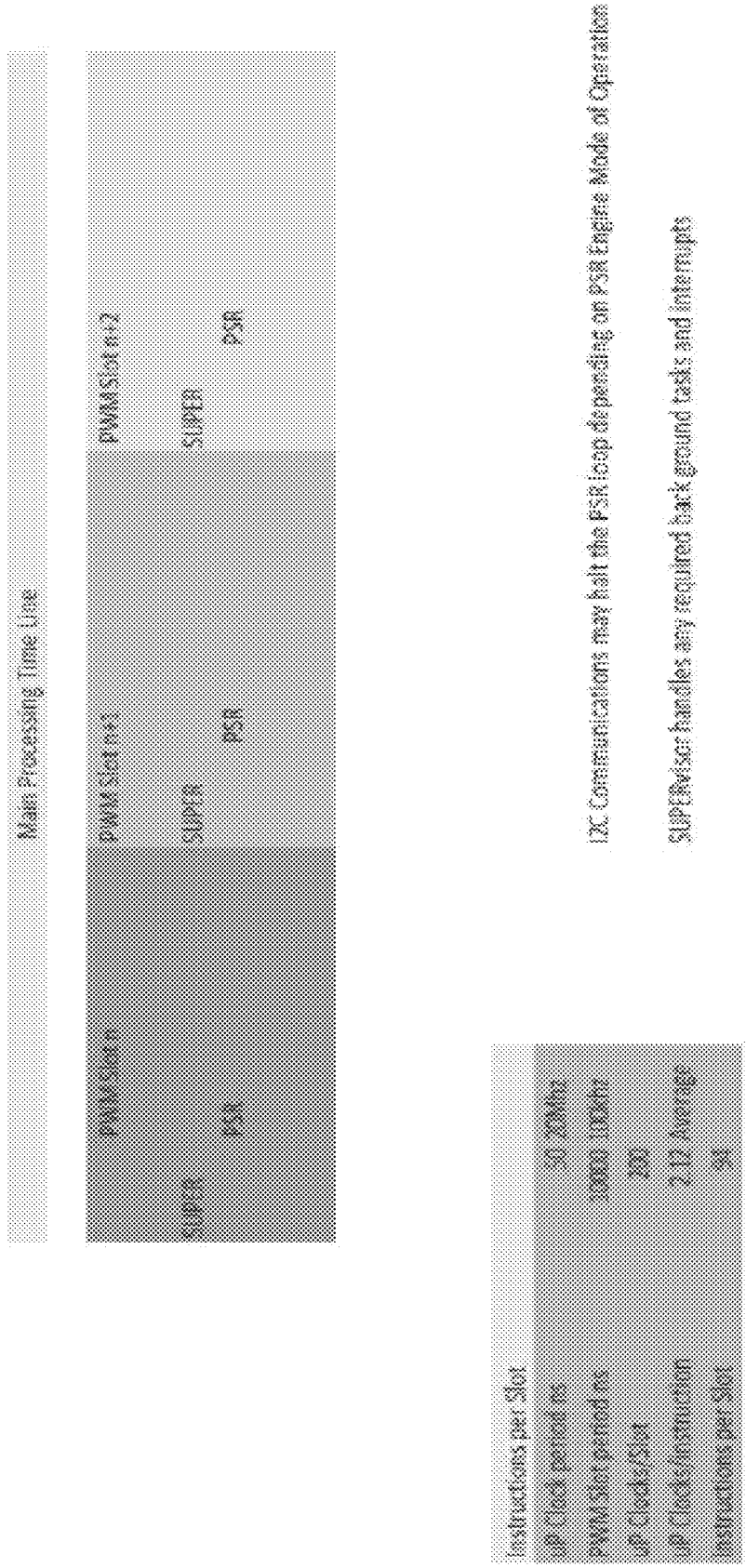
FIG. 13 is a block diagram of the digital primary side regulation execution processing time line.

In some embodiments, when the PSR Engine is under micro-controllers direct supervision, the micro-controller may monitor and interject data into the PSR Engine at key computational points. In these and other embodiments, a PWM cycle may be 100 KHz or higher and may be derived from a micro-controller 20 MHz clock. Referring to FIG. 13, given that the clock frequencies above it follows that there are 200 micro-controller clock cycles per PWM cycle. Based on information from the micro-controller IP provider, on average the micro-controller may use 2.12 clocks per instruction. In some embodiments, the firmware running during a PWM Slot (cycle) may include a supervisory process as well as the PSR algorithm management.

In some embodiments, the micro-controller may include one or more 16 bit Timer (Timer 0), one or more multiply/division unit. (MDU), one or more slave I2C port; one or more watchdog timer, ISR controller; one or more OCDS interface (On Chip Debug System), or any combination thereof.

Additionally or alternatively, the micro-controller may include one or more 80251 based micro-controller (16 bit) which may provide the overall system control and PSR control loop management. Additionally or alternatively, the 80251 based micro-controller may include processing power to address future modifications to the PSR control loop algorithm.

Figure 14:
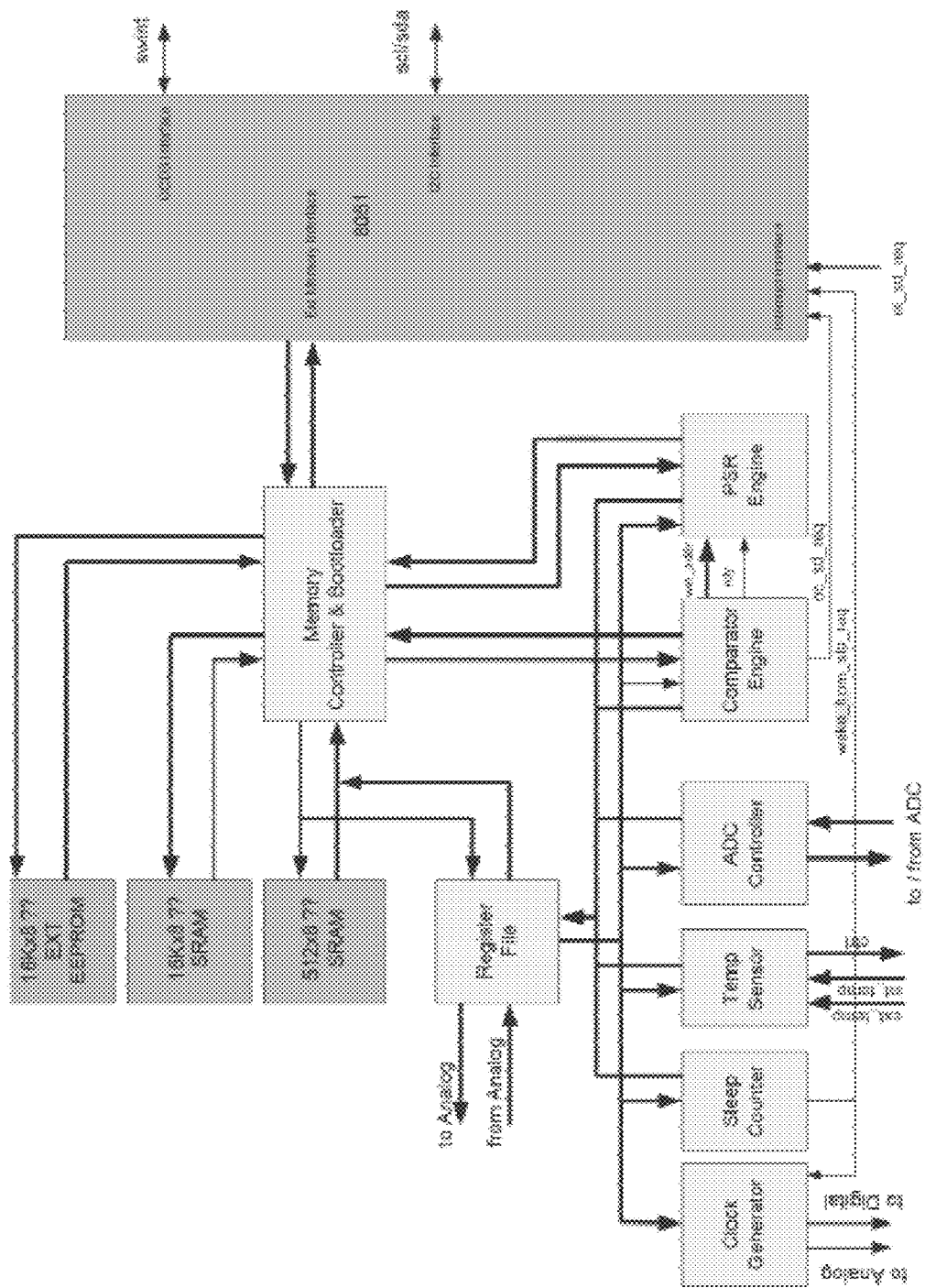
FIG. 14 is a block diagram of an 8051 digital subsystem that may be used with a primary side regulation system.
Figure 15:
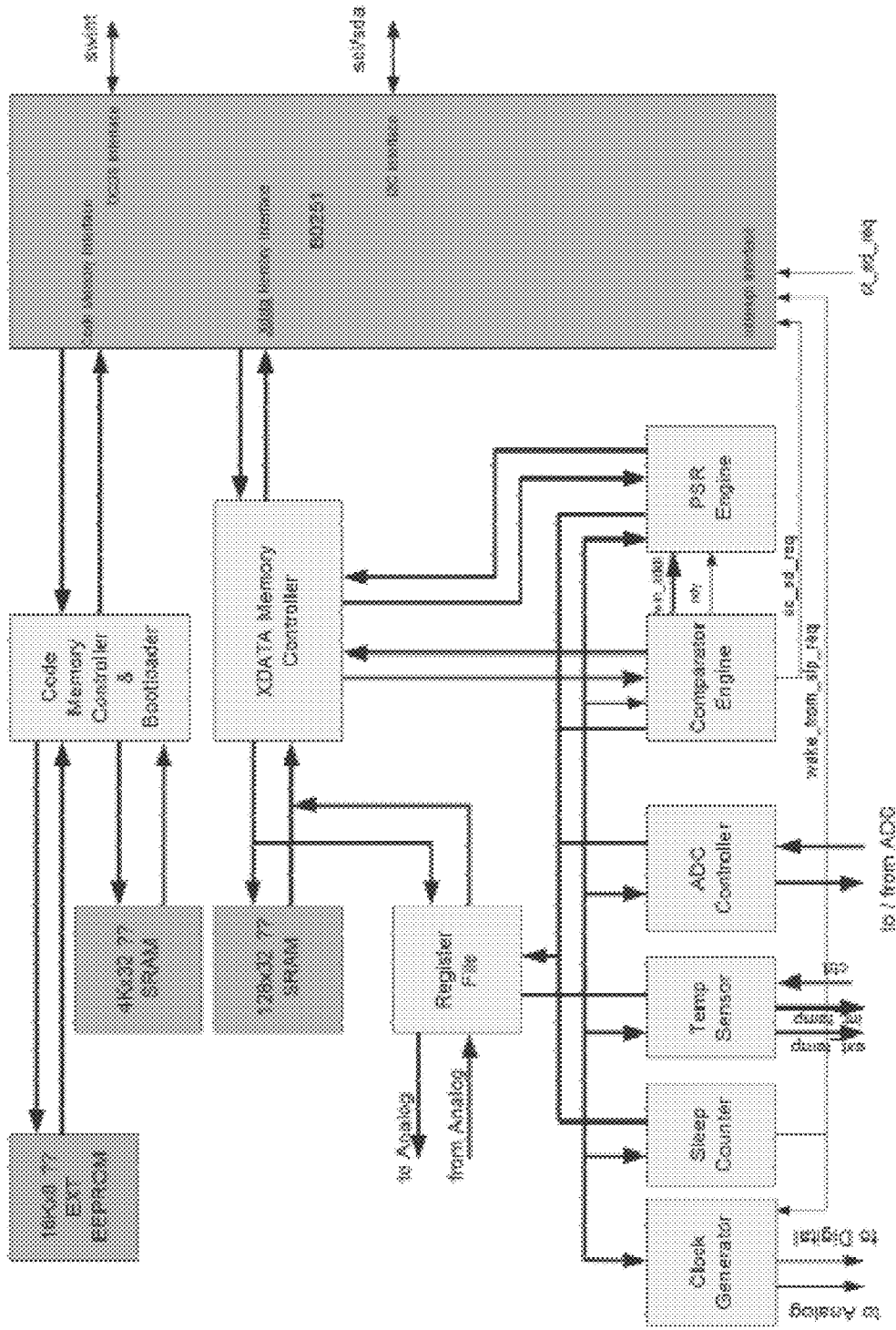
FIG. 15 is a block diagram of an 80251 digital sub system that may be used with the primary side regulation system.

FIG. 14 is a block diagram of an 8051 digital subsystem that may be used with a primary side regulation system. FIG. 15 is a block diagram of an 80251 digital sub system that may be used with the primary side regulation system. In some embodiments, the micro-controller may be implemented as a Harvard architecture including two memory spaces, code memory, and data memory. The two memory spaces may be shared with a common external memory bus. Code or data memory may be accessed per micro-processor cycle. In addition, the micro-controller IP may support 8 bit code and data busses. In some embodiments, processing power of the micro-may be increased, which may support more computationally intensive tasks than an 8051 based architecture.

In some embodiments, the code memory space may be implemented using static random access memory (SRAM) or similar. The data memory space may be implemented using SRAM and/or a register file. This may support comparisons performed implementing the PSR control loop. In these and other embodiments, a hardware comparator engine to off-load the firmware processing requirements may be implemented. Voltage and/or current ranges associated with the different coarse current level windows may be stored in SRAM along with the gain factor and offset values for each coarse current level window and/or fine current level window. The Comparator Engine may compare a current level against the PRWTs, which may be stored in the SRAM. When the primary regulation window (PRW) (e.g. coarse current level window and/or fine current level window) is identified, the comparator engine may update a register with an index into the SRAM that includes the gain factors and offset values for that particular PRW. The micro-controller may access the SRAM using the index. The corresponding gain factors and offset values located at that index, may be loaded into the PSR Engine to start performance of PSR control loop calculations. At startup the micro-controller may move the PRWTs, gain factors, and offset values into the SRAM from the NVM.

Additionally or alternatively, the PSR Engine may offload the computational requirements of the PSR algorithm from firmware. The PSR Engine may perform arithmetic calculations for the PSR control loop. In some embodiments, the PSR Engine may be programmable in terms of gain factors. In some embodiments, the micro-controller may observe and control integrator output, (e.g., a 12-bit counter used for fine tuning the integrator reference), and digitized ADC outputs for peak voltage and instantaneous current. The micro-controller may also control the PSR update rate as well as when calculations start.

In some embodiments, the PSR Engine may be configured in an autonomous mode, such that the arithmetic calculations are executed when the comparator engine completes any processing without micro-controller intervention.

In some embodiments, the ADC controller may be dedicated hardware to support low level control of the successive approximation register (SAR) analog to digital converter (ADC) in the Analog Sub-System. Calibration may be controlled via firmware. Once initiated, the ADC conversions for the PSR control loop may be controlled by an ADC controller. The ADC controller may support three independent channels for peak voltage, instantaneous current, and average current. Additionally or alternatively, there may be an on-board temp sensor for the IC and for the module, which may provide input for error corrections as temps vary.

In some embodiments, the digital sub-system may implement power management features, including a Sleep Mode, during which most of the Digital Sub-System and portions related to regulation in the Analog Sub-System are disabled to reduce current consumption. The sleep counter may be dedicated hardware and may control a duration of the Sleep Mode. This may allow for the micro-controller to be disabled, via clock gating, during Sleep Mode.

In some embodiments, the micro-controller may be implemented as an 8051 soft core. Additionally or alternatively, the micro-controller will be an 80251 soft core. In these and other embodiments, the PSR-LV digital sub-system may implement digital portions of the PSR loop. The determination of the coarse current level window and/or fine current level window, and PSR control loop calculations, may be done in fixed logic under micro-controller supervision. In some embodiments, generation of the actual PWM waveform may be performed by the Analog Sub-System. In these and other embodiments, the remaining supervisory functions may be implemented in firmware running on the micro-controller.

In some embodiments, the PSR-LV digital sub-system may support three independent channels. For example, a peak voltage channel, a peak current channel, and an average current channel on the primary winding of the transformer. Additionally or alternatively, the PSR-LV digital sub-system may calibrate the gain factors and the offset value under firmware control for each of the three channels. In some embodiments, the PSR-LV digital sub-system may automatically correct for the gain factors and the offset values implemented by the ADC Controller. Additionally or alternatively, the PSR-LV digital sub-system may synchronize conversion of current and voltage to rising and falling edges of the PWM clock respectively.

In some embodiments, the PSR-LV may support module calibration. In some embodiments, an internal temp sensor may be used for compensation for the PSR control loop due to external component drift. Additionally or alternatively, the internal temp sensor may be used for over temperature fault condition. In some embodiments, an external temp sensor may be used for compensation for the PSR control loop due to external component drift. In these and other embodiments, the external temp sensor may be used for over temperature fault condition In some embodiments, the PSR-LV Digital sub-system may generate one or more clocks to for the Analog sub-system and/or the Digital sub-system on the PSRLV ASIC. For example, the digital sub-system may generate a clock with a frequency of 20 Mega hz. In another example, the digital sub-system may generate a clock with a frequency of 100 KHz. In these and other embodiments, the digital sub-system may generate a sleep counter clock that is divided down so as to provide programmable sleep duration increments. For example, the sleep duration increments may be implemented within a range of 0.5 seconds up to 16 seconds.

In some embodiments, the PSR-LV Digital sub-system may implements an $I^2C$ slave or similar communications interface. In these and other embodiments, the $I^2C$ may support manufacturing tests. In some embodiments, the $I^2C$ may program the code space in the NVM after an initial code load. In these and other embodiments, the $I^2C$ communication may occur at any time and may be from external sources. For example the $I^2C$ communication may be received from a cell phone, indicating to turn on, turn off, or set a future time for turn on/off of an electronic device. In some embodiments, the PSR control loop may be disabled when communication is active depending on PSR mode.

In some embodiments, the PSR-LV may support internal or external NVM. In these and other embodiments, the NVM may be programmed over the $I^2C$ port or a UART. Additionally or alternatively, the NVM may be programmed using a Debug port. The NVM content may be protected using an EDAC algorithm. In some embodiments, the NVM may be managed by firmware such that other devices and circuits that include correctable errors may be relocated in the NVM. In these and other embodiments, the PSR-LV may implements a boot loader, which may include boot up information that supports micro-controller boot operation with an un-programmed NVM.

In some embodiments, the PSR-LV may implement a debug system interface provided by the micro-controller IP provider. In these and other embodiments, the Debug port may be used to program the NVM.

In some embodiments, the PSR-LV may use trimming on die. Additionally or alternatively, the PSR-LV may not use trimming on die. In these and other embodiments, an internal Vref bandgap may be less than +/−2% for 5% module accuracy. In these and other embodiments, an external Vref for module accuracy <5%, may use 0.2% external reference for module accuracy of 0.5%.

In some embodiments, the PSR-LV may support the following manufacturing tests: 1) a manufacturing test where the Digital sub-system implements scan chains for the logic. 2) a manufacturing test where the Digital sub-system implements (MBIST, Parallel external access, JTAG) testing for the memories, i.e., RAM and possible ROM for a micro-controller based architecture. 3) a manufacturing test where the Digital sub-system tests support functions to support analog testing and trimming using dedicated hardware.

In some embodiments, a principle of Primary-Side Regulation may determine instantaneous current and voltage on the primary winding of the transformer. In these and other embodiments, this information may be used to regulate the secondary output voltage by Pulse-Width-Modulation (PWM) of the primary-side switch circuit.

Referring to FIG. 4, the instantaneous voltage on the primary winding of the transformer 102 may be determined during a reset of the transformer 102. For example, the instantaneous voltage on the primary winding of the transformer 102 may be determined when the primary side switching device 278 is off. In another example, the instantaneous voltage on the primary winding of the transformer 102 may be determined when the primary side switching device 278 is turned on. In some embodiments, a resonant reset of the transformer 102 may be achieved with a 230 pF external capacitor (e.g. capacitive element 282) connected between the primary winding and ground.

In some embodiments, the external components of the PSR circuit may include primary side switching device 278, the resistive element 286, the capacitive element 282, capacitor, C1, and the transformer 102.

In some embodiments, the voltage feedback loop may include a peak detector and an instrumentation amplifier. In these and other embodiments, the voltage feedback information may be obtained by determine the differential voltage across the primary winding of the transformer 102. In some embodiments, the voltage may be determined at an output of a charge pump on the power circuit 22.

In some embodiments, the voltage may be amplified by an instrumentation amplifier whose gain is set by a mode pin. In these and other embodiments, the mode pin may indicate a type of electronic device the forward converter 96 is coupled to. Additionally or alternatively, multiple gains may be supported by the transformer 102. In these and other embodiments, the gains may be implemented as ratio of the feedback resistor to the input resistor in the instrumentation amplifier.

In some embodiments, a window comparator may compare the output of the instrumentation amplifier against the low window value and/or the high window value. In these and other embodiments, a logic Decoder may derive an up and down signal based on the comparison. In these and other embodiments, the up down signal may drive an 8-bit R2R DAC. In some embodiments, the DAC may adjust the reference voltage to achieve a particular output voltage regulation from 4.5 Amps to 300 mA.

In some embodiments, the current feedback loop may compare the low-pass filtered voltage using a switched-capacitor instrumentation amplifier with a digitally programmable gain. In these and other embodiments, the gain may account for a range of parasitic resistances which can be seen on the Secondary. In some embodiments, the resistances may include the diode series resistance for diodes D1 and D2, the winding resistance of the secondary side of the transformer, the interconnect resistance of the PCB and IC metal traces, the series resistance of the inductor, or any combination thereof.

In some embodiments, the primary side regulation circuit 240 may be implemented using flash. In these and other embodiments, the primary side regulation circuit 240 may be implemented using flash by using a PID loop and performing remote determining. Additionally or alternatively, the primary side regulation circuit 240 may be implemented without flash. This may be due to flash operating at three megahertz for a five bit and including 32 comparators and a resistor running at 3 megahertz, it In some embodiments, implementing a Primary Side Sensing approach may provide Improved Primary-Side Remote Sense Architecture, Reduced Current Consumption by Eliminating Flash ADC's, Improved Startup Mode, Better Regulation Accuracy not Limited by ADC Resolution, Analog Feedback allows Opto-Isolator Feedback as Backup or Alternative, or any combination thereof.

In some embodiments, the Primary Side Sensing and Regulation may be based on a Secondary Output Voltage and may be determined in accordance with equation 7:

$$V_{OUT} = \left(V_{PRIM}\frac{-V_{PRIMp}}{N}\right) \times \frac{t_{RST}}{t_{SW}} \times \frac{2}{\pi \cdot (N_P/N_S)} \qquad \text{Equation 7}$$

In some embodiments, $V_{OUT}$ may be calculated where $V_{OUT}$ is a function of only the primary side parameters. Wherein NP over Ns is the turns ratio of the transformer, $V_{PRIM}$ may be the voltage on the primary winding of the transformer, N may be the number of coarse current level windows.

Referring to FIG. 4, in some embodiments, the primary side regulation circuit 240 may include an analog Primary Side Sensing/Regulation Scheme (APSSR). The APSSR may include a different amplifier, which measures the energy peak, which also may be implemented by a peak detector, which measures the peak of the wave. When the primary side switch circuit 276 is closed, there may not be information, voltage, or current. Additionally or alternatively, when the primary side switch circuit 276 is closed, there may not be information, voltage, or current implemented by the Digital Primary Side Sensing/Regulation Scheme (DPSSR). In some embodiments, during a reset cycle, the voltage on the primary side of the transformer 102 may go up causing the transformer 102 to become demagnetizing.

In some embodiments, a Digital to Analog Convertor (DAC) may increase resolution to be able to accommodate more settings. In these and other embodiments, the difference amplifier may include an alternate (e.g., the window comparator. In these and other embodiments, the reset time may be determined by measuring the voltage, the differential voltage, which is the Y axis, but one would also want to measure the time that it took for the inductance to be reset. Reset means that the differential voltage is zero. The differential voltage starts at zero because the MOSFET (that drives the transformer) switch is, initially when the switch is closed, you basically place 110 volts by 0 volts across the inductance, the magnetizing inductance on the primary side and when you open the switch, there is an additional voltage that is a different voltage that is generated across the inductance and that's a function of the load current, how much load is being pulled from the secondary side.

In some embodiments, the window comparator, and the counter may be electrically coupled. In these and other embodiments, the counter may reset and the output of the counter may mimic with a digital value which reflects the reset time. In these and other embodiments, the counter may be linearly related to the reset time. Additionally or alternatively, the reset time may be less than a maximum reset time. For example, the maximum resent time may be 10 microseconds, because that the time, switching time, or the time slot. the $V_{TRST}$ or the $V_{TSW}$, now you would calculate the reset time by this counter, by this window comparator/time to voltage peak counter, then one would get one number and then you already know that $V_{TSW}$ is a full scale of the counter so that, so one gets two sets of different numbers, another PGA, which is basically shown as one PGA, but you can have another PGA which basically does the division, basically calculates the ratio.

Thus, the time may convert into digital number; and then that digital number may drive a DAC, so the system is going from Digital to Analog. Then the analog voltage, a ratio of analog voltages which is a function of middle part of the equation. In some embodiments, the timing, time ratio may be converted into a voltage ratio and then compared with a known voltage, differential voltage that has been measured through the MOSFET peak detector across the magnetizing inductors. In some embodiments, the PGA may multiply it and divide it depending a configuration and that may represent $V_{OUT}$ on the secondary winding. In some embodiments, $V_{OUT}$ actual may be on an output of the PGA. The integrator may take the difference of Vout and a comparative voltage on one side of the integrator, and then the actual voltage on the other side of the integrator, the difference is the error which gets integrated, and then digitized by the comparator, then this information may be similar to the original PID loop in the DPSSR.

Thus, the integrator may drive the comparator, which may take the header and modifies that that into a pulse width, the pulse may be of different pulse width, and that may drive the transformer MOSFET switch (the gate switch) and then there's a clock generator which may be constantly running at 100 kilohertz. S There may be two different quantities that are dynamically changing, one is the magnetizing voltage, it's the V set time, depending on the load current, and the other is the time for the transformer to demagnetize, or the time for reset.

Thus, in the DPSSR one may use two flash ADC's, one for the feed detector path and one for the time-to-voltage converter path. In the instance of the DPSSR, one would therefore may use two flash ADC's and then all the digital arithmetic, logic log to do the math, to calculate the actual $V_{OUT}$ desired and the digital format in some embodiments, shown here as the APSSR, that that is analog, it's low power, and does not require external components, and it's also compatible with the PID, so that it can turn off and use the opto isolation option, which provides an alternative and enhanced flexibility.

As shown in FIG. 4, on the secondary one embodiment of the circuit had transistors and the other has diodes. Because of the IR drop with diodes, in this embodiment, MOSFETS may be used. Income embodiments, it may manage the IR drop on the secondary side so that's, so without the diodes out because of the V forward voltage loss that the APSSR system is not able to calculate. Therefore, using transistors (MOSFETS) may provide a much lower IR drop and so basically the IR drop may be mainly limited by the inductor, ESR that transformer turns ratio ESR and then. In some embodiments, the turn ratio may be about 26 milliohms and then the drop across the M2 transistor called M2 on the return side.

The system may be load dependent and as the load changes on the secondary side, the IR losses may change. In addition, there may be a droop in the system as it operates. Thus, voltage V out will go down, and may start to droop as load current goes up.

In some embodiments, one way to compensate in the APSSR is to just to compensate without having another servo loop. In this fashion, one would compensate for the secondary side losses (IR drops) so that it is always at the mid-point. Thus, it may be compensated for 1 A instead of 4 amp, between 4 A and 50 mA.

Some of the key features of the Tronium PSR-LV System may be as follows: Primary-Side Regulation of Final Output Voltage using an advanced PSR windowing algorithm; High-Voltage Switched-Capacitor Voltage Divider; Switch-Mode Buck Regulator Controller; Country Select LINE Voltage Monitor; Embedded 8051 Micro-processor for execution of power management firmware; 12-bit SAR ADC for high-speed sampling of current and voltage; Flash NVM for Code Storage; Ultra-Low Power Dissipation for Idle (Vampire) Mode of Operation; Optional Opto-Isolated Interface for Analog Sensing of the Output Voltage; and I2C Slave Interface Port for Manufacturing Test.

The Tronium PSR-LV System may combine the high-efficiency Tronium High-Voltage Voltage Divider IC with the Tronium Primary-Side Regulation-Low Voltage (PSR-LV) advanced power controller IC for output voltage regulation with high-efficiency and high accuracy. The two Tronium IC's may provide a total solution for Primary-Side Regulation which may monitor the voltage and current on the primary side of the transformer for control of the secondary output voltage. As a result, the number of external components may be minimized providing a cost and area effective solution for power control. When no current is being drawn by the load the device may enter a low-current mode of operation to minimize the traditional 'vampire' current required to stay awake.

Some of the key features of the Tronium PSR-LV IC may be as follows: Primary-Side Regulation of Final Output Voltage using an advanced PSR windowing algorithm; Embedded 8051 Micro-processor for execution of power management firmware; 12-bit SAR ADC for high-speed sampling of current and voltage; Flash NVM for Code Storage; Ultra-Low Power Dissipation for Idle (Vampire) Mode of Operation; Optional Opto-Isolated Interface for Analog Sensing of the Output Voltage; and I2C Slave Interface Port for Manufacturing Test.

The Tronium PSR-LV System may be configured for the following applications:

The Tronium Primary-Side Regulation Low-voltage (PSR-LV) IC may be combined with the Tronium High-Voltage Voltage Divider to provide a complete solution with AC line voltages of 108V-132V and may exist in two chips, based on high or low voltage circuits, or may exist in one IC which has both high and low voltage devices and circuits. High voltage circuits may be relative depending on input and targeted output. With European and US type outlet voltages being considered, typically high voltage may be devices and circuits which may be designed to withstand in excess of 35-50 volts up to 600 v, with low voltage circuits including circuits less than the 35-50 v circuits and devices.

Bandgap: The Bandgap reference voltage of the Tronium PSR-LV IC may be trimmed to obtain regulation accuracies of less than ±1.5%. As a result, a 4-bit register word may be stored in memory with the trim information which may be obtained at either IC package or module test. High accuracy applications can also be supported with the use of an external Bandgap reference generator. For this mode of operation, the internal Bandgap of the IC can be disabled via register control.

The Master Oscillator of the Tronium PSR-LV IC may be designed for high accuracy and will not require trim.

The 12-bit voltage and current sensor ADC of the Tronium PSR-LV IC may implement a two point gain and offset calibration to be performed on a periodic basis. The following routine may be used: 1) Apply VREFL and perform a conversion. Store the result as dout_offset. 2) Apply VREFH and perform the conversion. The result is dout(refhi). 3) calculate the gain factor as gain factor=(dout(refhi)−dout_offset)/4096; 4). For all subsequent conversions the result can be gain and offset corrected as follows: dout_corrected= (dout(actual)−dout(reflo)/gain_factor.

Temperature calibration for the PSR may be performed automatically in the background so that no manual calibration is needed at the factory or in the field. The auto-calibration is completed in the following manner: 1) For a given load current at a known temperature a specific PSR window may be selected; 2) The pre-stored offsets and gain may then be used to calculate the specific output code which will provide 5.0V at 25 C (room temperature); and 3) As the temperature changes from 25 C, for the same fixed load current, another set of gains and offsets may be applied that will fine tune the output to maintain regulation at 5.0V. Each window may include a coarse tune (load current dependence) and a fine tune (temperature sensor) dependence that is used to maintain regulation.

An on-chip temperature sensor may be provided on the Tronium PSR-LV IC to provide the means for calibration. It may be characterized/simulated over the temperature range of −40 C to 125 C in 20 degree increments, since it may be used to calculate the slope and offset for temperature fine tuning. An off-chip temp sensor (RTD or delta VBE) may be used instead of the on-chip version.

The Tronium Windowed PSR (Power Side Regulation) may implement a low cost, high efficiency method of providing a regulated isolated secondary voltage source. Referring to FIG. 1, in one embodiment, the primary side regulation circuit 240 may include an isolation transformer, reset capacitor, switching transistor and controller. The isolation transformer may be operated in the forward converter mode to minimize the amount of energy the core must store and therefore reduce the transformer's core size. The secondary voltage output may be regulated using the transformer's reflective inductor pulse which represents the power delivered to the secondary load. The magnitude of the reflective inductor pulse may increase with increasing load power. A programmable controller may compensate for the non-linear characteristic of the reflective inductor pulse and may provide for more accurate regulation over temperature and component variations. The controller may implements a multi-window method (e.g. 64 windows) whereby each window may represent a segment of the load current. Each window may include a programmable gain and offset component to enable full characterizing of any transformer configuration. The number of windows may be dependent on the non-linear characteristics of the transformer and the required accuracy of the secondary voltage regulation. The controller may drive the gate of a switching MOSFET to implement a PWM switcher. The PSR feedback signal may be the reflective inductor pulse. This pulse must be reset (current through the transformer's primary must be zero) for each PWM cycle for a proper feedback signal that represents the current secondary load condition. Correct selection of the reset capacitor's value may ensure that the transformer resets before the next PWM cycle. Referring to FIG. 7, the timing events of the PWM cycle and the occurrence of the reflective inductor pulse of the primary side regulation circuit 240 are illustrated including plot 294 illustrating the MOSFET Gate Drive for primary side switching device 278 and plot 296 illustrating the reflective inductor pulse measured by voltage sensor 290. Referring to plot 294, Data Point (A) may be the start of the PWM cycle, MOSFET turned on, Data Point (B) is the MOSFET turned off, and Data Point (C) is the End of PWM cycle. Referring to plot 296, Data Point (D) is the occurrence of reflective inductor pulse and Data Point (E) is the transformer reset event.

The patentable scope is defined by the claims, and may include other examples that occur to those skilled in the art. Other aspects and features can be obtained from a study of the drawings, the disclosure, and the appended claims. The embodiments disclosed herein may be practiced otherwise than as specifically described within the scope of the appended claims. It should also be noted, that the steps and/or functions listed within the appended claims, notwithstanding the order of which steps and/or functions are listed therein, are not limited to any specific order of operation.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments illustrated and described herein is not essential, unless otherwise specified. That is, the operations described herein may be performed in any order, unless otherwise specified, and embodiments may include additional or fewer operations than those disclosed herein. For example, it is contemplated that executing or performing a particular operation before, contemporaneously with, or after another operation is within the scope of aspects of the embodiments disclosed herein.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are only examples, and thus are not intended to limit in any way the definition and/or meaning of the term processor.

In some embodiments, a memory device includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables a processor to store, retrieve, and/or execute instructions and/or data.

In some embodiments, a database, as described herein, includes any collection of data including hierarchical databases, relational databases, flat file databases, object-relational databases, object oriented databases, and any other structured collection of records or data that is stored in a computer system. The above examples are only examples, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Although specific features of various embodiments may be shown in some drawings and not in others, this is for convenience only. In accordance with the principles of the embodiments disclosed here, any feature of a drawing may be referenced and/or claimed in combination with any feature of any other drawing.

What is claimed is:

1. A method, comprising:
   determining a peak voltage level on a primary winding of a transformer;
   selecting a particular coarse current level window based on the determined peak voltage level, wherein the particular coarse current level window is one of a plurality of coarse current level windows;
   determining a low window value based on the particular coarse current level window;
   generating a reference voltage based on the low window value;
   generating a control signal based on the reference voltage; and
   transmitting the control signal to a switch circuit coupled to the primary winding of the transformer to adjust a current level on the primary winding of the transformer.

2. The method of claim 1, wherein selecting the particular coarse current level window based on the determined peak voltage level comprises selecting a fine value window within the particular coarse current level window.

3. The method of claim 1, the method further comprising:
   determining a voltage level on the primary winding of the transformer; and
   determining a temperature level on the primary winding of the transformer.

4. The method of claim 3, wherein determining the low window value based on the particular coarse current level window comprises:
   determining a gain factor associated with the particular coarse current level window;
   determining an offset factor associated with the particular coarse current level window; and
   determining the low window value based on the gain factor and the offset factor.

5. The method of claim 4, the method further comprising determining a high window value based on the low window value and an integer.

6. The method of claim 5, the method further comprising:
   comparing the voltage level to the low window value and the high window value; and
   generating an up down counter output value based on comparing the voltage level to the low window value and the high window value.

7. The method of claim 6, wherein generating the control signal based on the reference voltage comprises:

determining a secondary reference voltage based on the up down counter output value and the low window value;
determining a digital word associated with a particular duty cycle of the switch circuit based on a digitized value of the current level, the up down counter output value, and the low window value;
determining a filtered digital word associated with the particular duty cycle of the switch circuit based on the digital word associated with the particular duty cycle, a first integer, a second integer, a third integer, a S value, and a T value; and
determining a duty cycle of the control signal based on the digital word associated with the particular duty cycle of the switch circuit, a least significant voltage level in a voltage range, and a low reference value for a digital to analog converter.

8. The method of claim 7, wherein transmitting the control signal to the switch circuit comprises:
   comparing the control signal to a saw-tooth signal;
   generating a pulse width modulated signal based on comparing the control signal to the saw-tooth signal; and
   transmitting the pulse width modulated signal as the control signal to the switch circuit.

9. The method of claim 1, wherein the control signal is a first control signal, the method further comprising:
   determining whether to start in a soft start mode, wherein the soft start mode generates a second control signal at a default level; and
   in response to determining to start in the soft start mode:
      determining whether a startup time window has elapsed; and
      in response to determining the startup time window has elapsed, determining the peak voltage level on the primary winding of the transformer.

10. A system, comprising:
    a transformer;
    a forward converter electrically coupled to the transformer, the forward converter configured to generate an output power signal based on a power signal on the transformer; and
    a primary side regulator configured to regulate the power signal on the transformer, the primary side regulator comprising:
       a primary side switch circuit; and
       a regulating controller configured to:
          determine a peak current level on a primary winding of the transformer;
          select a particular coarse current level window based on the determined peak current level, wherein the particular coarse current level window is one of a plurality of coarse current level windows;
          determine a low window value based on the particular coarse current level window;
          generate a reference voltage based on the low window value;
          generate a control signal based on the reference voltage; and
          transmit the control signal to the primary side switch circuit coupled to the primary winding of the transformer to adjust a current level on the primary winding of the transformer.

11. The system of claim 10, wherein the regulating controller is further configured to select a fine value window within the particular coarse current level window.

12. The system of claim 10, wherein the regulating controller is further configured to:
 determine a voltage level on the primary winding of the transformer; and
 determine a temperature level on the primary winding of the transformer.

13. The system of claim 12, wherein the regulating controller is further configured to:
 determine a gain factor associated with the particular coarse current level window;
 determine an offset factor associated with the particular coarse current level window; and
 determine the low window value based on the gain factor, the offset factor, and the temperature level.

14. The system of claim 13, wherein the regulating controller is further configured to determine a high window value based on the low window value and an integer.

15. The system of claim 14, wherein the regulating controller further comprises an up down counter, the regulating controller is further configured to:
 compare the voltage level to the low window value and the high window value; and
 operate the up down counter to generate an output value based on comparing the voltage level to the low window value and the high window value.

16. The system of claim 15, wherein the regulating controller is further configured to:
 determine a secondary reference voltage based on the output value and the low window value;
 determine a digital word associated with a particular duty cycle of the primary side switch circuit based on a digitized value of the current level, the output value, and the low window value;
 determine a filtered digital word associated with the particular duty cycle of the primary side switch circuit based on the digital word associated with the particular duty cycle, a first integer, a second integer, a third integer, a S value, and a T value; and
 determine a duty cycle of the control signal based on the digital word associated with the particular duty cycle of the primary side switch circuit, a least significant voltage level in a voltage range, and a low reference value for a digital analog converter.

17. The system of claim 16, wherein the regulating controller is further configured to:
 compare the control signal to a saw-tooth signal;
 generate a pulse width modulated signal based on comparing the control signal to the saw-tooth signal; and
 transmit the pulse width modulated signal as the control signal to the primary side switch circuit.

18. The system of claim 10, wherein the control signal is a first control signal, wherein the regulating controller is further configured to:
 determine whether to start in a soft start mode, wherein the soft start mode generates a second control signal at a default level; and
 in response to determining to start in the soft start mode:
  determine whether a startup time window has elapsed; and
  in response to determining the startup time window has elapsed, determine the current level on the primary winding of the transformer.

19. A system, comprising:
 a transformer;
 a forward converter electrically coupled to the transformer and configured to generate an output power signal based on a power signal on the transformer; and
 a primary side regulator configured to regulate the power signal on the transformer, the primary side regulator comprising:
  a primary side switch circuit electrically coupled to a primary winding of the transformer;
  a resistive element electrically coupled to the primary side switch circuit and to ground;
  a voltage sensor configured to determine a voltage level on the primary winding of the transformer by determining a resistive voltage level on the resistive element;
  a capacitive element electrically coupled to the primary winding of the transformer, the capacitive element configured to reset the transformer; and
  a regulating circuit comprising;
   a window selector circuit configured to select a particular coarse current level window and a particular fine value window within the particular coarse current level window based on the resistive voltage level;
   a window value circuit configured to determine a low window value based on the particular coarse current level window;
   a reference voltage generator configured to generate a reference voltage based on the low window value;
   a control signal generator configured to generate a control signal based on the reference voltage; and
   a transmitter configured to transmit the control signal to the primary side switch circuit to adjust a current level on the primary winding of the transformer.

20. The system of claim 19, the primary side regulator further comprising a temperature sensor configured to determine a temperature level within the system, the regulating circuit further comprising:
 a factor selector configured to determine a gain factor and an offset factor associated with the particular coarse current level window;
 the window value circuit further configured to determine the low window value based on the gain factor, the offset factor, and the temperature level and to determine a high window value based on the low window value and an integer; and
 the transmitter further configured to compare the control signal to a saw-tooth signal, generate a pulse width modulated signal based on comparing the control signal to the saw-tooth signal, and transmit the pulse width modulated signal as the control signal to the primary side switch circuit.

* * * * *

UNITED STATES PATENT AND TRADEMARK OFFICE
CERTIFICATE OF CORRECTION

PATENT NO. : 10,263,529 B2
APPLICATION NO. : 16/103754
DATED : April 16, 2019
INVENTOR(S) : Sandusky et al.

It is certified that error appears in the above-identified patent and that said Letters Patent is hereby corrected as shown below:

On the Title Page

Item [72] insert:
--Michael H. Freeman--

Signed and Sealed this
Seventeenth Day of September, 2019

Andrei Iancu
*Director of the United States Patent and Trademark Office*